(12) United States Patent
Niedert et al.

(10) Patent No.: US 12,370,853 B2
(45) Date of Patent: *Jul. 29, 2025

(54) METHODS AND APPARATUS TO DETERMINE VEHICLE WEIGHT

(71) Applicant: Ford Global Technologies, LLC, Dearborn, MI (US)

(72) Inventors: Andrew Niedert, New Hudson, MI (US); Peter Simeon Lazarevski, Dearborn, MI (US); Rinku Patel, Kalamazoo, MI (US); Anton Rogness, Dearborn, MI (US); Elliott Pearson, Shelby Township, MI (US); Joshua Rajasingh, Ypsilanti, MI (US); Salvador Padilla, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,632

(22) Filed: Jan. 10, 2023

(65) Prior Publication Data
US 2023/0141344 A1 May 11, 2023

Related U.S. Application Data

(63) Continuation of application No. 16/264,217, filed on Jan. 31, 2019, now Pat. No. 11,560,031.

(Continued)

(51) Int. Cl.
*B60G 17/015* (2006.01)
*B60G 17/017* (2006.01)

(52) U.S. Cl.
CPC ....... *B60G 17/0157* (2013.01); *B60G 17/017* (2013.01); *B60G 2400/252* (2013.01);
(Continued)

(58) Field of Classification Search
CPC .............. B60G 17/0157; B60G 17/017; B60G 2400/252; B60G 2500/02; B60G 2600/18; B60G 2800/20
See application file for complete search history.

(56) References Cited

U.S. PATENT DOCUMENTS

| 5,393,939 A | * | 2/1995 | Nasuta, Jr. | ............ | G01G 19/005 |
| | | | | | 177/210 R |
| 6,567,734 B2 | | 5/2003 | Bellinger et al. | | |

(Continued)

FOREIGN PATENT DOCUMENTS

| DE | 19963402 | 7/2001 | | |
| DE | 102007015356 A1 | * | 10/2008 | ........... B60G 17/019 |

(Continued)

OTHER PUBLICATIONS

Baronti, F. "Sensorless Control of the Suspension Preload in Motorcycles," 01-Jun. 2008, 2008 IEEE International Symposium on Industrial Electronics (pp. 1125-1130) (Year: 2008).*

(Continued)

*Primary Examiner* — Scott A Browne
*Assistant Examiner* — Terry C Buse
(74) *Attorney, Agent, or Firm* — Lorne Forsythe; Hanley, Flight & Zimmerman, LLC

(57) ABSTRACT

Methods and apparatus to determine vehicle weight are disclosed. An example apparatus includes a suspension airbag, a pump fluidly coupled to the suspension airbag, the pump to control a fluid pressure in the suspension airbag to cause ride height adjustments for a vehicle, a motor operatively coupled to the pump, and processor circuitry to calculate a weight of the vehicle based on an offset between (a) a first motor input that causes the vehicle to rise or lower (Continued)

when the vehicle is unloaded and (b) a second motor input that causes the vehicle to rise or lower when the vehicle is carrying a load.

20 Claims, 10 Drawing Sheets

Related U.S. Application Data

(60) Provisional application No. 62/658,967, filed on Apr. 17, 2018.

(52) U.S. Cl.
CPC ...... *B60G 2500/02* (2013.01); *B60G 2600/18* (2013.01); *B60G 2800/20* (2013.01)

(56) References Cited

U.S. PATENT DOCUMENTS

| | | | |
|---|---|---|---|
| 7,398,668 B2 | 7/2008 | Nordmeyer | |
| 7,660,654 B2 | 2/2010 | Lu et al. | |
| 8,188,385 B2 | 5/2012 | Wolfgang et al. | |
| 8,396,627 B2 | 3/2013 | Jung et al. | |
| 9,310,242 B2 | 4/2016 | Kammann et al. | |
| 10,752,075 B1* | 8/2020 | Shukla ................ | B60G 11/27 |
| 11,560,031 B2 | 1/2023 | Niedert et al. | |
| 2005/0087389 A1* | 4/2005 | Turner ................ | B60W 30/04 |
| | | | 180/446 |
| 2008/0007392 A1* | 1/2008 | Hax .................... | G01G 23/3728 |
| | | | 280/124.1 |
| 2009/0072460 A1* | 3/2009 | Michel ................ | B60G 21/0555 |
| | | | 267/225 |
| 2009/0184480 A1* | 7/2009 | Larsson .............. | B60G 17/017 |
| | | | 701/469 |
| 2010/0108406 A1* | 5/2010 | Wuerthner .......... | G01G 19/086 |
| | | | 177/136 |
| 2011/0036646 A1 | 2/2011 | Dack | |
| 2011/0285186 A1* | 11/2011 | Demmelmeier ..... | B60N 2/0248 |
| | | | 701/49 |
| 2015/0224845 A1* | 8/2015 | Anderson ........... | F03G 7/08 |
| | | | 701/37 |
| 2016/0202111 A1* | 7/2016 | Fahey ................. | B65D 90/143 |
| | | | 254/89 R |
| 2017/0225535 A1 | 8/2017 | Batsch et al. | |
| 2017/0260028 A1* | 9/2017 | Verheyen ............ | G01G 19/14 |
| 2018/0118221 A1* | 5/2018 | Hall .................... | B60W 10/18 |
| 2018/0194357 A1* | 7/2018 | Hall .................... | B60W 40/13 |
| 2020/0198432 A1* | 6/2020 | Tate ................... | B60G 17/0157 |
| 2020/0232842 A1* | 7/2020 | Huang ................ | B60W 30/143 |
| 2020/0276876 A1* | 9/2020 | Dockter .............. | B60G 17/0152 |

FOREIGN PATENT DOCUMENTS

| | | | | |
|---|---|---|---|---|
| DE | 102008026825 | | 12/2009 | |
| DE | 102014001031 | | 7/2015 | |
| DE | 102015213550 A1 * | | 1/2017 | ............ B60T 8/18 |
| GB | 2373224 | | 9/2002 | |
| JP | 4336250 | | 12/2005 | |
| JP | 2005335593 | | 12/2005 | |
| JP | 2008162782 A * | | 7/2008 | ............ B66B 5/00 |
| KR | 101867735 B1 * | | 12/2016 | ............ G01G 23/01 |

OTHER PUBLICATIONS

Baronti, F. Sensorless Control of the Suspension Preload in Motorcycles, Jun. 1, 2008, 2008 IEEE International Symposium on Industrial Electronics (pp. 1125-1130) (Year: 2008).*

Baronti, F. "Sensorless Control of the Suspension Preload in Motorcycles," Jun. 1, 2008, 2008 IEEE International Symposium on Industrial Electronics (pp. 1125-1130) (Year: 2008) (Abstract only, full text of U.S. Appl. No. 16/264,217).

United States Patent and Trademark Office, "Non-Final Rejection," issued in connection with U.S. Appl. No. 16/264,217, dated Jan. 22, 2021, 21 pages.

United States Patent and Trademark Office, "Non-Final Rejection," issued in connection with U.S. Appl. No. 16/264,217, dated Jul. 19, 2021, 20 pages.

United States Patent and Trademark Office, "Final Rejection," issued in connection with U.S. Appl. No. 16/264,217, dated Nov. 5, 2021, 24 pages.

United States Patent and Trademark Office, "Non-Final Rejection," issued in connection with U.S. Appl. No. 16/264,217, dated Mar. 4, 2022, 22 pages.

United States Patent and Trademark Office, "Final Rejection," issued in connection with U.S. Appl. No. 16/264,217, dated Jun. 17, 2022, 22 pages.

United States Patent and Trademark Office, "Notice of Allowance and Fee(s) Due," issued in connection with U.S. Appl. No. 16/264,217, dated Sep. 15, 2022, 7 pages.

* cited by examiner

METHODS AND APPARATUS TO DETERMINE VEHICLE WEIGHT

RELATED APPLICATIONS

This patent arises from a continuation of U.S. patent application Ser. No. 16/264,217 (now U.S. Pat. No. 11,560, 031), which was filed on Jan. 31, 2019. U.S. patent application Ser. No. 16/264,217 claims the benefit of U.S. Provisional Patent Application No. 62/658,967, which was filed on Apr. 17, 2018. U.S. patent application Ser. No. 16/264, 217 and U.S. Provisional Patent Application No. 62/658,967 are hereby incorporated herein by reference in their entireties. Priority to U.S. patent application Ser. No. 16/264,217 and U.S. Provisional Patent Application No. 62/658,967 is hereby claimed.

FIELD OF THE DISCLOSURE

This disclosure relates generally to vehicles and, more particularly, to methods and apparatus to determine vehicle weight.

BACKGROUND

Some vehicles such as vans, trucks, sport utility vehicles (SUVs), etc. can carry significant weight and are associated with weight limits that should not be exceeded. As such, to ensure proper vehicle handling and/or performance during normal use, a vehicle is loaded such that cargo, freight, etc. carried thereby does not exceed a weight limit of the vehicle. A driver may determine whether a vehicle is properly loaded by visual inspection of the vehicle (e.g., based on a ride height of the vehicle associated with rear wheels of the vehicle). Alternatively, the driver may drive the vehicle to a weigh station to determine a weight of the vehicle.

SUMMARY

An example apparatus includes a vehicle controller configured to control a motor operatively coupled to a suspension system to raise or lower a vehicle. The vehicle controller is also to determine a first parameter of the motor while controlling the motor to raise or lower the vehicle when the vehicle is unloaded. The vehicle controller is also to determine a second parameter of the motor while controlling the motor to raise or lower the vehicle when the vehicle is at least partially loaded. The vehicle controller is also to calculate a weight of the vehicle based on the first and second parameters of the motor.

An example vehicle includes a suspension system. The vehicle also includes a controller configured to control, via a motor, the suspension system to adjust a ride height of the vehicle. The controller is also to perform a comparison of first and second parameters of the motor. The first parameter is based on operating the motor when the vehicle is unloaded. The second parameter is based on operating the motor when the vehicle is at least partially loaded. The controller is also to calculate a weight of the vehicle based on the comparison.

An example tangible machine-readable storage medium includes instructions which, when executed, cause a processor to at least control a motor operatively coupled to a suspension system to change a ride height of a vehicle. The instructions also cause the processor to determine a first parameter of the motor while controlling the motor to raise or lower the vehicle when the vehicle is unloaded. The instructions also cause the processor to determine a second parameter of the motor while controlling the motor to raise or lower the vehicle when the vehicle is loaded. The instructions also cause the processor to calculate a weight of the vehicle based on the first and second parameters of the motor.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1A:
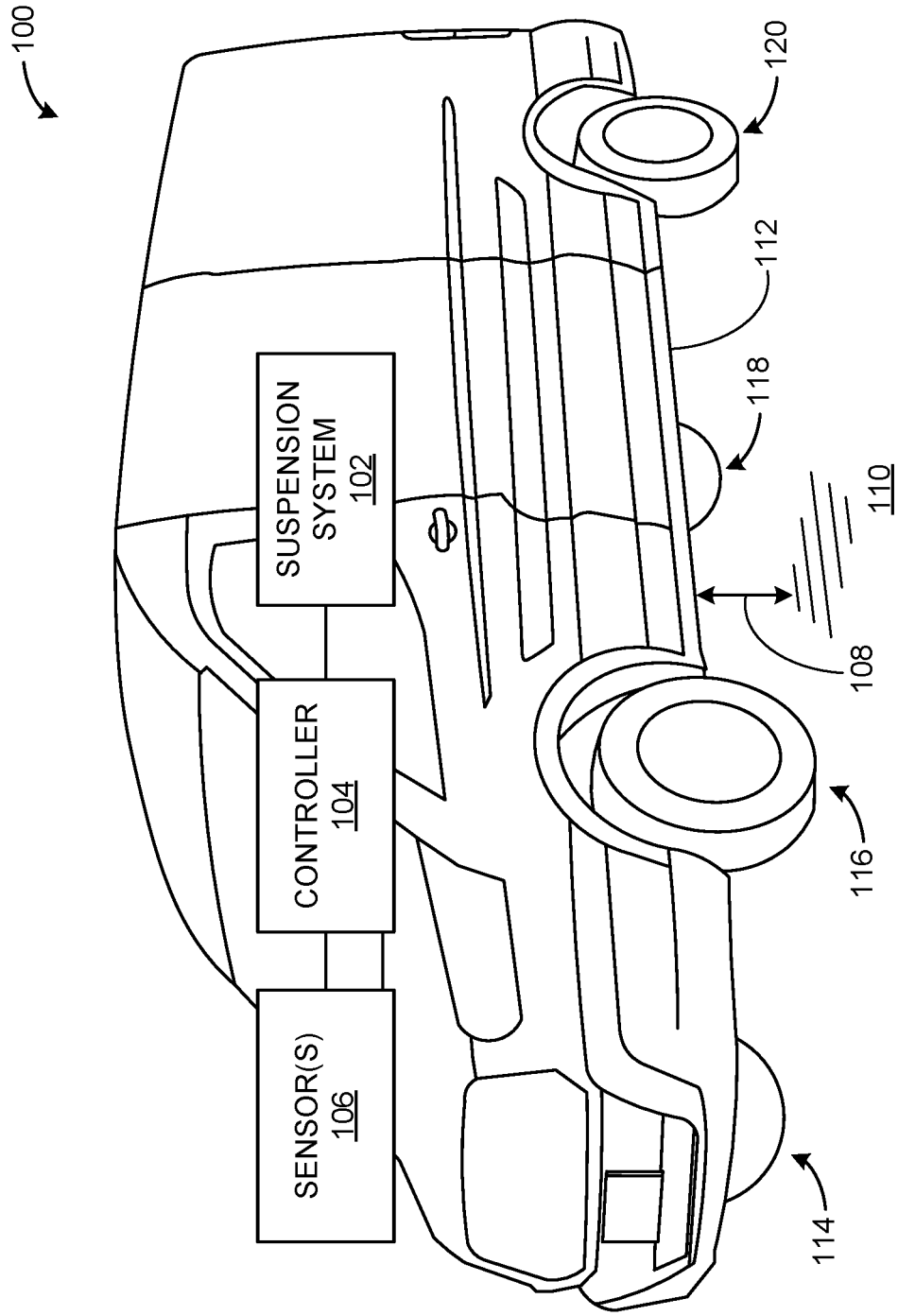
FIG. 1A is a view of an example vehicle in which examples disclosed herein may be implemented.

Some vehicles are enclosed such that cargo carried by the vehicle is not visible from outside the vehicle, which impedes a driver from visually determining a vehicle weight and/or a distribution of the vehicle weight. Further, some vehicles are implemented with known height leveling systems (sometimes referred to as ride height leveling (RHL) systems) that raise or lower the vehicle based on a weight distribution of the vehicle, which maintains a uniform or constant ride height across a chassis of the vehicle. Such known leveling systems further impede the driver from determining how the vehicle is loaded based on an appearance of the vehicle. Further, known weight measuring systems may not be capable of effectively and/or accurately measuring vehicle weight due to interference from a known RHL system. As a result, the driver may improperly load (e.g., overload) the vehicle, which adversely affects ride quality or vehicle stability and/or may incur costs (e.g., tickets and/or fees associated with operating an overloaded vehicle). Additionally, an improperly loaded vehicle can wear and/or degrade one or more vehicle components.

Methods and apparatus to determine vehicle weight are disclosed. Examples disclosed herein determine a weight (e.g., an average weight, an axle weight, etc.) associated with a vehicle and inform a person (e.g., a driver, a passenger, vehicle service personnel, etc.) of the weight, which assists the person in properly loading and/or operating the vehicle. In particular, disclosed examples advantageously utilize many types of known suspension architecture and/or hardware having RHL functionality to calculate and/or estimate vehicle weight, which reduces costs that are typically associated with additional hardware (e.g., sensors, processing units, etc.) required by the above mentioned known weight measuring systems.

Some disclosed examples provide an example vehicle controller (e.g., an electronic control unit (ECU)) communicatively and/or operatively coupled to an example suspension system having RHL functionality such as, for example, one or more of an active suspension system, an air suspension system, etc. In particular, the controller directs one or more motors of the suspension system to increase or decrease a ride height of the vehicle by raising or lowering a vehicle mass (e.g., a sprung mass including a payload). As the ride height is adjusted, the controller measures and/or detects, via a sensor, one or more parameters or data of the suspension system such as, for example, one or more of the ride height, input (e.g., a current, voltage, power, etc.) provided to the motor(s), and/or output (e.g., a torque, a force, etc.) provided from the motor(s). Such suspension data or parameters are related to and/or indicate a motor force and/or a motor torque that is sufficient to move the vehicle between different ride heights and, in turn, indicate the vehicle weight. Thus, disclosed examples determine vehicle weight based on operation of one or more suspension motors.

As discussed in greater detail below, to facilitate vehicle weight calculations, disclosed examples analyze different parameters and/or characteristics of the suspension system. In particular, the controller compares suspension data corresponding to the vehicle being at least partially loaded (e.g., via cargo, equipment, goods, etc.) with suspension data corresponding to the vehicle being unloaded, which can indicate a weight corresponding to one or more of cargo, equipment, goods, etc. carried by the vehicle.

Some disclosed examples analyze one or more data relationships or functions that may be represented as plots, maps, tables, etc. that is/are based on the obtained sensor data to aid in determining the vehicle weight. In such examples, the disclosed controller calculates and/or determines the vehicle weight based on one or more of shapes, inflections, transition points, minima, maxima, slopes, etc. associated with the data relationships. In particular, some disclosed examples calculate and/or determine the vehicle weight based on an offset between data sets, where each data set corresponds to, for example, a respective function or data plot. For example, the disclosed controller translates and/or converts a value of the offset to a value of the vehicle weight based on one or more equations, models, algorithms, and/or methods or techniques that, in some examples, is/are specific to a type of the vehicle.

Some disclosed examples generate alerts (e.g., sounds, messages, etc.) and provide the alerts to the person when the vehicle is loaded beyond a weight limit or carrying capacity thereof. Such examples deter the person from improperly loading the vehicle and/or operating an improperly loaded vehicle, which reduces the possibility of degradation of components of the vehicle and/or incurring costs from fees and/or tickets.

FIG. 1A is a view of an example vehicle (e.g., a van, a truck, a sport utility vehicle (SUV), etc.) 100 in which examples disclosed may be implemented. The vehicle 100 of FIG. 1A includes an example suspension system 102, an example vehicle controller 104, and one or more example sensors 106.

As will be discussed in greater detail below in connection with FIGS. 1B, 1C 2-9, the controller 104 of the illustrated example communicates with and/or controls the suspension system 102 to change a height 108 (sometimes referred to as a ride height) of the vehicle 100 and, in response, determines a weight of the vehicle 100. Stated differently, the controller 104 utilizes the suspension system 102 to raise or lower a mass (e.g., a sprung mass) of the vehicle 100. The height 108 of the illustrated example is a distance between a driving surface (e.g., concrete, asphalt, dirt, etc.) 110 and a bottom (in the orientation of FIG. 1A) portion 112 of the vehicle 100 such as, for example, the chassis. In other examples, the ride height 108 corresponds to a different distance that is associated with one or more components of the vehicle 100 and/or the surface 110. In some examples, the ride height 108 corresponds to a position of a motor and/or an actuator of the vehicle 100.

Figure 1B:
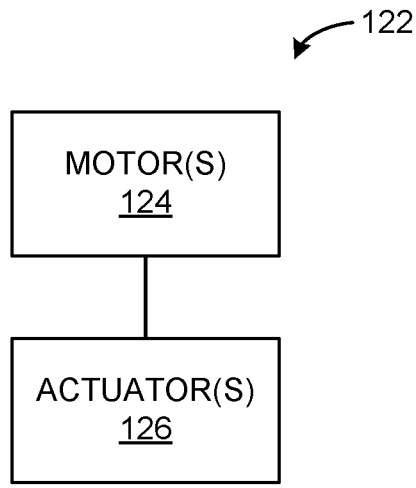
FIGS. 1B and 1C are block diagrams showing example suspension component configurations in accordance with examples disclosed herein.
Figure 1C:
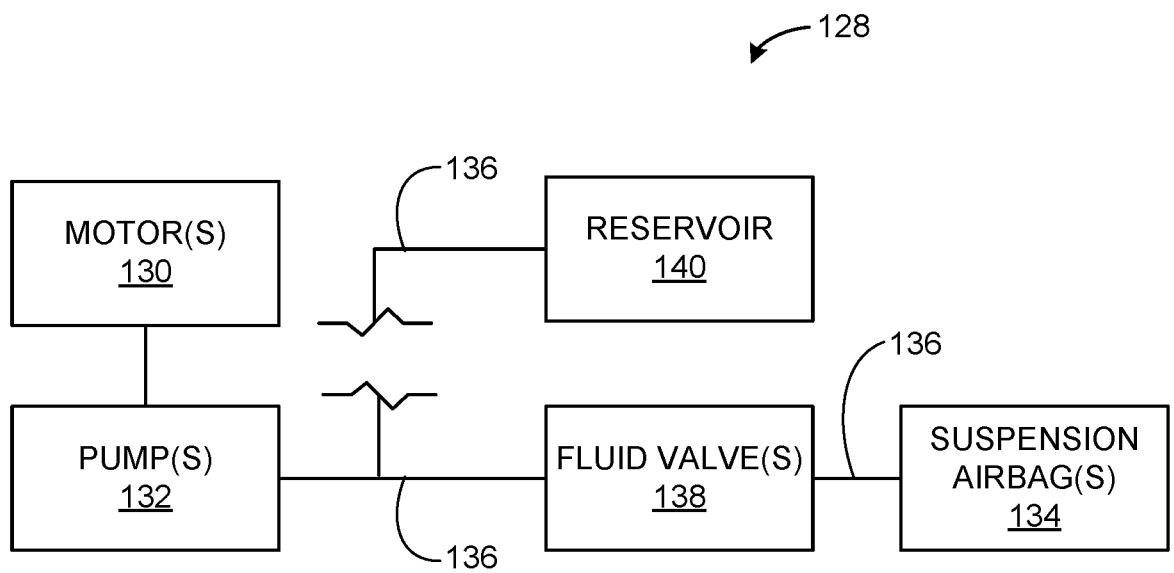

The controller 104 of FIG. 1 enables one or more actuators (e.g., one or more linear actuators, one or more rotary actuators, one or more pneumatic actuators, etc.) 126, 134 (shown in FIGS. 1B and 1C) of the suspension system 102 to change the height 108 for at least a portion of the vehicle 100. In particular, the controller 104 directs one or more motors 124, 130, 202 operatively coupled to the suspension system 102, as discussed further below. In some examples, the controller 104 provides height adjustments based on feedback data received from the sensor(s) 106 corresponding to the ride height 108 at different areas (e.g., at each corner of the vehicle 100) of the bottom portion 112. In this manner, the controller 104 improves vehicle handling and/or maneuverability by maintaining a substantially uniform height 108 along the bottom portion 112 of the vehicle 100.

The suspension system 102 of FIG. 1 is operatively coupled to the vehicle 100 to enable ride height adjustments for the vehicle 100. In some examples, the suspension system 102 of FIG. 1A is implemented as an active suspension system or semi-active suspension system such that one or more linear and/or rotary actuators 126 is/are advantageously used to adjust the height 108. In other examples, the suspension system 102 of FIG. 1A is implemented differently. For example, the suspension system 102 can be implemented as an air suspension system such that a fluid (e.g., compressed air) is advantageously used to control the height 108 via one or more pneumatic actuators 134.

In some examples, the height 108 corresponds to one or more wheels 114, 116, 118, 120 of the vehicle 100, four of which are shown in this example. That is, in some examples, each wheel 114, 116, 118, 120 has a ride height 108 proximate thereto. As such, in some examples, the ride heights 108 of the wheels 114, 116, 118, 120 can be the same or different relative to each other.

The controller 104 of FIG. 1A is communicatively coupled to the vehicle 100, the sensor(s) 106, and the suspensions system 102, for example, via one or more signal transmission wires or busses, radio frequency, wireless transmissions, etc. In some examples, the controller 104 is implemented using one or more electronic control units (ECUs).

To measure and/or detect one or more parameters associated with the vehicle 100 and/or the suspension system 102, the sensor(s) 106 of FIG. 1A can include, but is/are not limited to, a ride height sensor, a current sensor, a voltage sensor, a torque sensor, a force sensor or load cell, and/or a position sensor (e.g., a rotational position sensor and/or a linear position sensor). In some examples, the controller 104 measures and/or detects the height(s) 108 via the sensor(s) 106. In some examples, the controller 104 measures and/or detects one or more of electrical current, voltage, and/or power used by the suspension system 102 (e.g., as a result of changing the height 108). In some examples, the controller 104 measures and/or detects a motor torque and/or a motor force generated by the suspension system 102 and imparted on the vehicle 100.

FIG. 1B is a block diagram showing an example first configuration 122 of suspension components in accordance with examples disclosed herein. In some examples, the first configuration 122 of FIG. 1B is used to implement the suspension system 102 of FIG. 1A.

In the example of FIG. 1B, the one or more motors (e.g., electric motors) 124 are operatively coupled to the one or more actuators 126 to provide a torque and/or a force thereto. In some examples, the actuators 126 are operatively coupled to one or more components of the suspension system 102 such as, for example, an example shock absorber assembly 200 (shown in FIGS. 2 and 3). In such examples, the controller 104 controls the motor(s) 124 to move or change a position of the actuator(s) 126, thereby changing the ride height 108.

FIG. 1C is a block diagram showing an example second configuration 128 of suspension components in accordance with examples disclosed herein. In some examples, the second configuration 128 of FIG. 1C is used to implement the suspension system 102 of FIG. 1A.

In the example of FIG. 1C, the one or more motors (e.g., electric motors) 130 are operatively coupled to one or more pumps or compressors 132 to compress a fluid (e.g., air). In particular, in such examples, the controller 104 of FIG. 1 enables the pumps 132 to increase or decrease a fluid pressure in one or more suspension airbags 134 coupled between components of the suspension system 102 and/or the vehicle 100 such that the airbag(s) 134 expand or contract, thereby changing the ride height 108. In some examples, the vehicle 100 is implemented with multiple suspension airbags 134 to enable ride height adjustments for areas of the bottom portion 112 that are proximate to each of the wheels 114, 116, 118, 120.

In some examples, the pump(s) 132 and the airbag(s) 134 are fluidly coupled together, for example, via one or more example fluid lines 136. In some examples, to facilitate control of fluid pressure in a suspension airbag 134, one or more fluid valves 138 are fluidly coupled between the suspension airbag(s) 134 and the pump(s) 132 via the fluid line(s) 136.

In some examples, to facilitate maintaining a sufficient fluid pressure in the suspension airbag(s) 134, a fluid reservoir 140 is fluidly coupled between the suspension airbag(s) 134 and the pump(s) 132 via the fluid line(s) 136. In some such examples, a single motor 130 and single pump 132 enable adjustments of the vehicle ride height 108. Further, in such examples, the controller 104 is communicatively and/or operatively coupled to the valve(s) 138 to control a position thereof.

Figure 2:
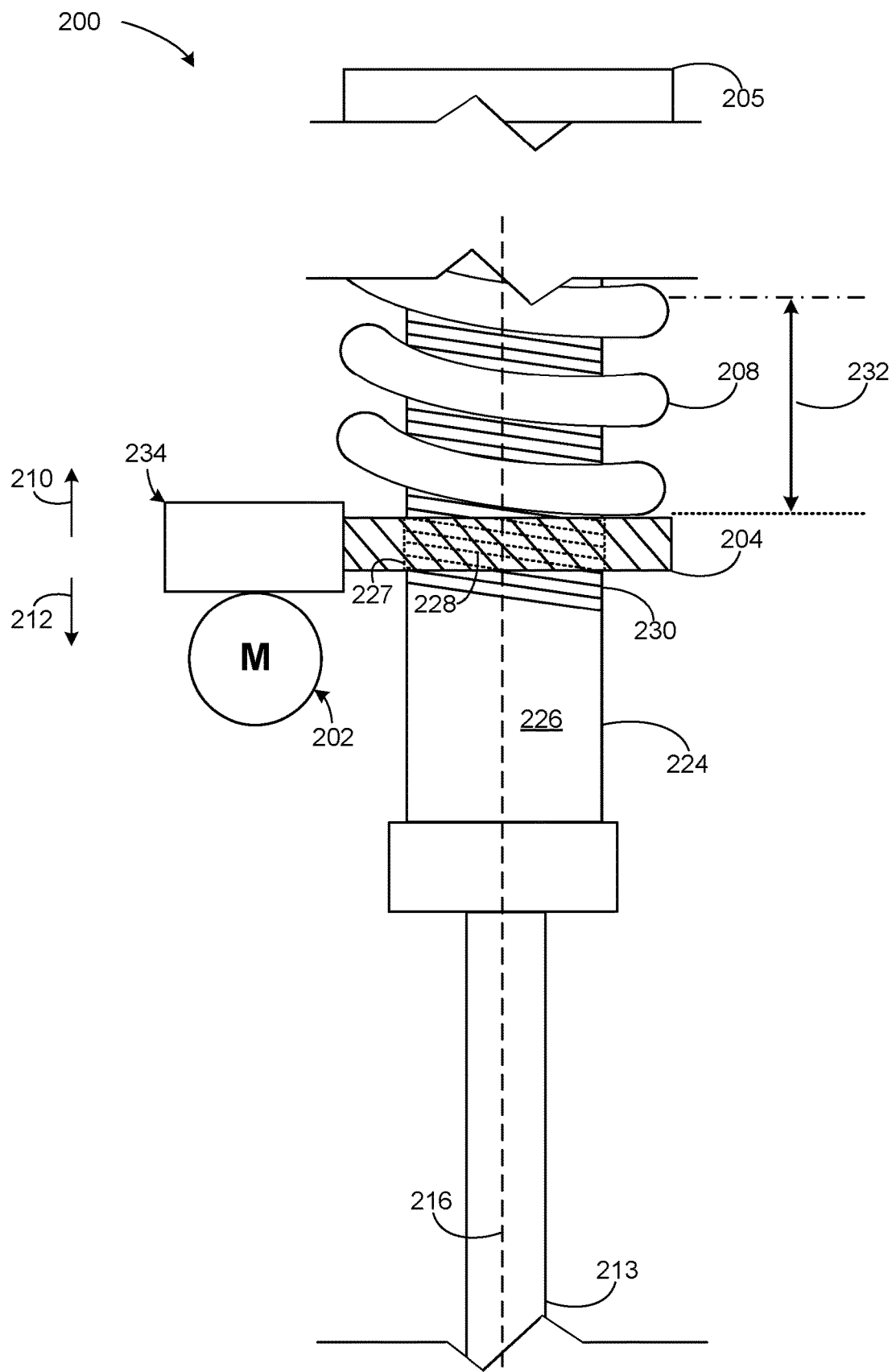
FIGS. 2 and 3 are detailed partial views of an example suspension component showing an example motor in accordance with examples disclosed herein.
Figure 3:
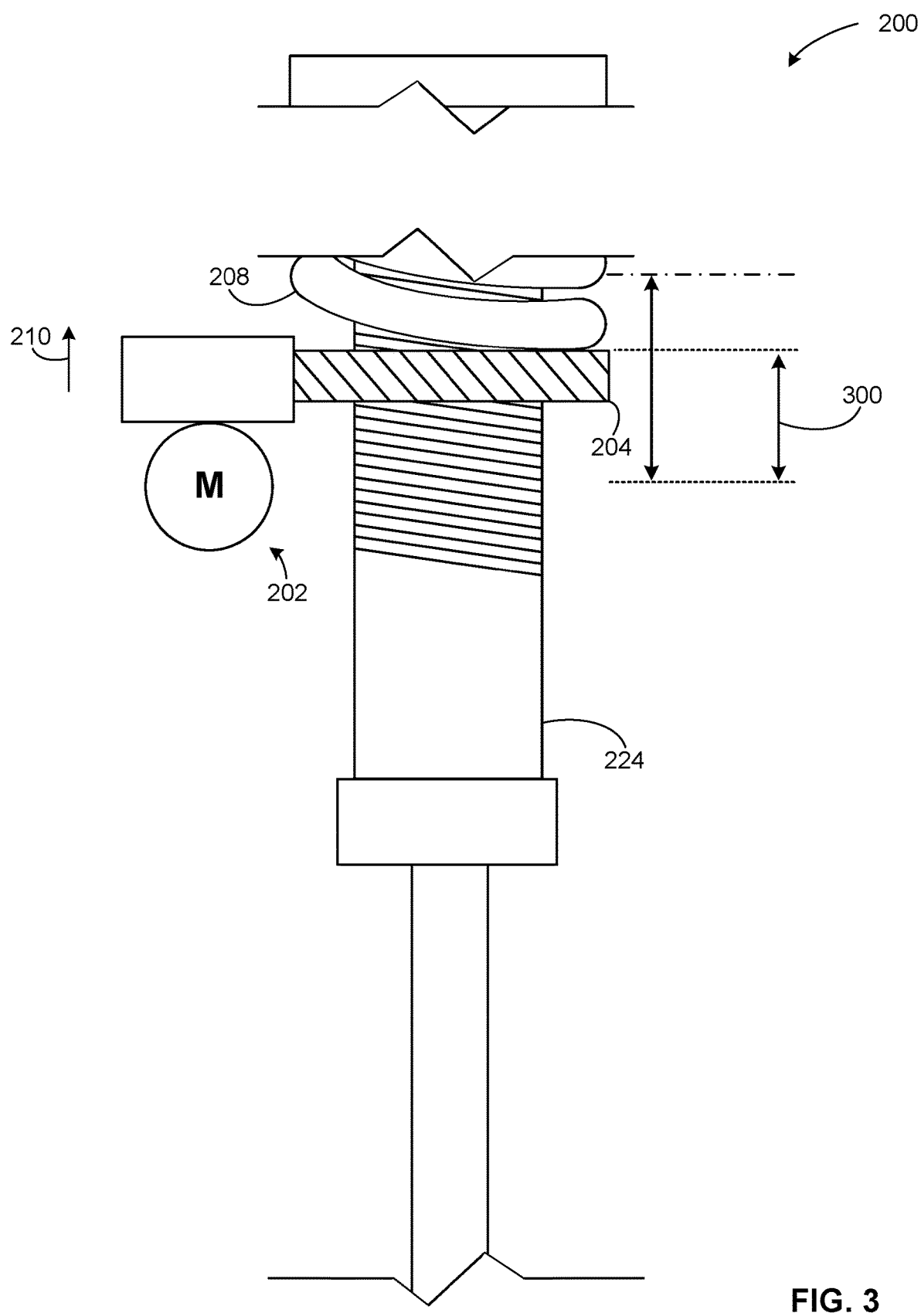

FIGS. 2 and 3 are detailed partial views of the example shock absorber assembly 200 showing the example motor (e.g., an electric motor) 202 in accordance with examples disclosed herein. In some examples, the shock absorber assembly 200 of FIGS. 2 and 3 is used to implement the aforementioned suspension system 102 disclosed in connection with FIG. 1A. In such examples, the suspension system 102 includes one or more shock absorber assemblies 200 to improve ride comfort and/or improve handling of the vehicle 100. For example, the vehicle 100 can be implemented with a shock absorber assembly 200 disposed proximate to one or more (e.g., each) of the wheels 114, 116, 118, 120.

According to the illustrated example of FIG. 2, the motor 202 is operatively coupled to the shock absorber assembly 200 to change the ride height 108 of the vehicle 100, for example, in response to receiving power and/or a command or control signal from the controller 104. In particular, the motor 202 generates a force and/or a torque and imparts the force and/or the torque on one or more components of the suspension system 102 and/or the vehicle 100. In the example of FIG. 2, the motor 202 enables a first seat 204 (sometimes referred to as a spring seat) to move (e.g., rotate and translate), thereby compressing or decompressing a spring (e.g., a coil spring) 208 that is interposed between and/or engaged with the first seat 204 and a second seat 205.

In some examples, as the spring 208 compresses and/or the first seat 204 moves in a first direction 210, the ride height 108 of the vehicle 100 increases. Conversely, in some examples, as the spring 208 decompresses and/or the first seat 204 moves in a second direction 212 opposite the first direction 210, the ride height 108 decreases.

In some examples, the second seat 205 is coupled to the bottom portion 112 of the vehicle 100 such as a portion of the vehicle chassis. In other examples, the second seat 205 is coupled to a portion of the suspension system 102 proximate an end 213 of the shock absorber assembly 200 that is associated with movement of one of the wheels 114, 116, 118, 120.

In the example of FIG. 2, the motor 202 is operatively coupled to the first seat 204. In particular, the motor 202 controls a position of the first seat 204 along an axis 216 of the shock absorber assembly 200. For example, the motor 202 generates a torque and imparts the torque on the first seat 204, thereby moving the first seat 204 and/or the motor 202 in the first direction 210 or the second direction 212. As a result, the first seat 204 and/or the motor 202 move between different positions within a movement range or distance 232. As shown in FIG. 2, the motor 202 and the first seat 204 are in a first position.

The first seat 204 of FIG. 2 is adjustably coupled (e.g., via threads 230 in this example) to the shock absorber assembly 200 such that the first seat 204 can move in the first direction 210 or the second direction 212 along the axis 216 in response to output from the motor 202. In some examples, the first seat 204 is adjustably coupled to a cylinder (e.g., a fluid damper tube) 224, which is sometimes referred to as a shock body. For example, the first seat 204 is threaded onto an outer surface 226 of the cylinder 224 such that the first seat 204 moves in the direction(s) 210, 212 by rotating relative to the cylinder 224. As shown in FIG. 2, an inner diameter 227 (represented by the vertical dotted/dashed lines) of the first seat 204 includes threads 228 (represented by the angled dotted/dashed lines) that engage the threads 230 disposed on the outer surface 226 of the cylinder 224.

In the example of FIG. 2, an example gear train or box 234 is operatively coupled between the motor 202 and the first seat 204 to facilitate mechanical power transfer therebetween. In some examples, the gear train 234 receives a first torque from the motor 202 and, in response, imparts a second torque on an outer surface (e.g., a threaded surface) of the first seat 204. In some such examples, the gear train 234 is implemented as a torque multiplier such that the second torque is greater than the first torque.

In some examples, the motor 202 and the gear box 234 move in the direction(s) 210, 212 without rotating relative to the cylinder 224. For example, a portion of the motor 202, the gear box 234, and/or a component associated therewith (e.g., a housing) is slidably coupled the cylinder 224 to maintain an orientation of the motor 202 and the gear box 234 during ride height adjustments.

As shown in the illustrated example of FIG. 3, the motor 202 enables the first seat 204 to move relative to the cylinder 224 in the first direction 210 from the first position (as shown in FIG. 2) to a second position (as shown in FIG. 3), thereby compressing the spring 208 and, as a result, increasing the ride height 108 of the vehicle 100 in this example. As such, the first seat 204 travels a first distance 300 from the first position to the second position.

Figure 4:
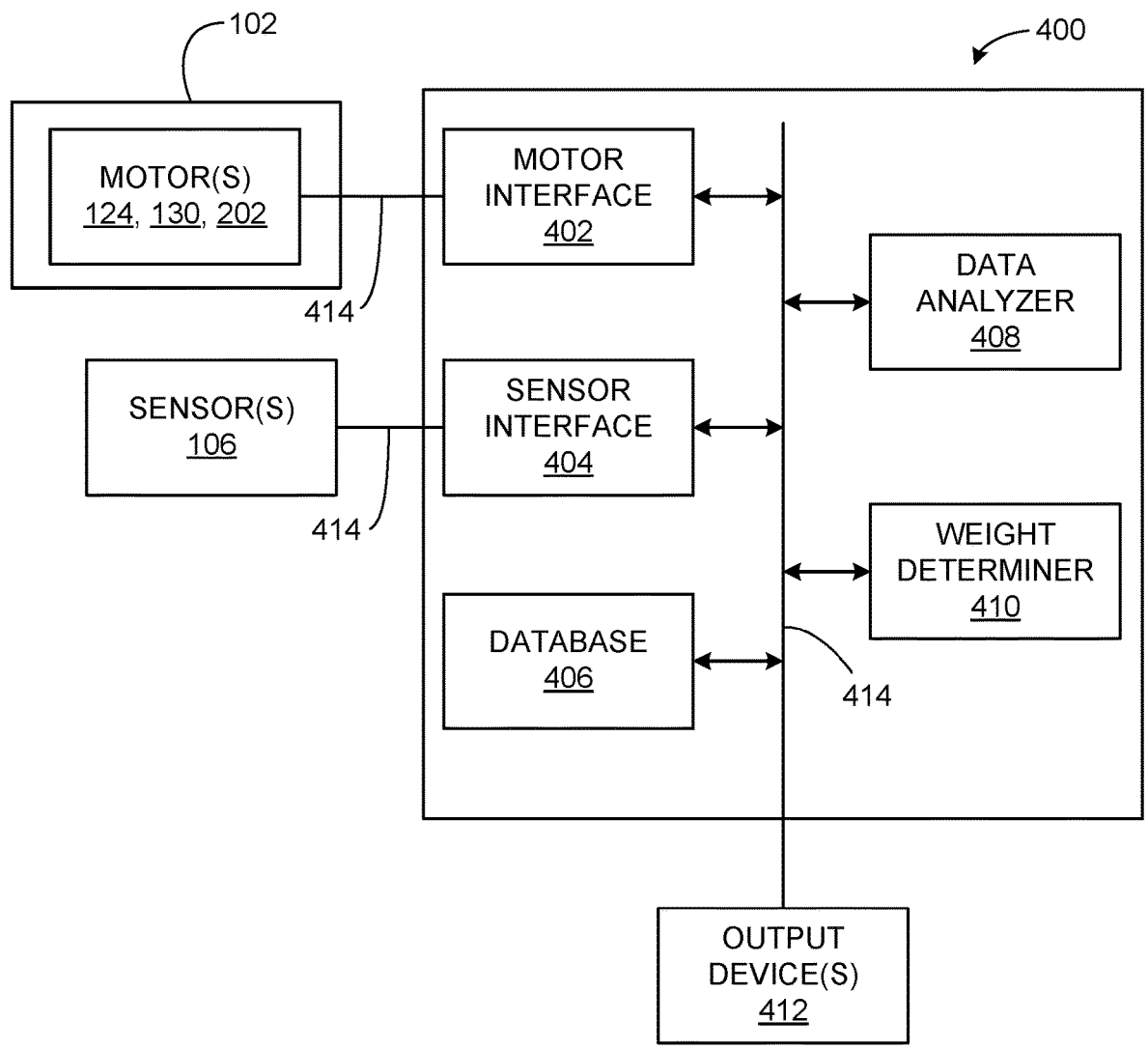
FIG. 4 is a block diagram of an example weight determination system in accordance with the teachings of this disclosure.

FIG. 4 is a block diagram of an example weight determination system 400 in accordance with the teachings of this disclosure. In some examples, the weight determination system 400 of FIG. 4 is implemented by the controller 104 of FIG. 1A. The example weight determination system 400 of FIG. 4 includes a motor interface 402, a sensor interface 404, a database 406, a data analyzer 408, and a weight determiner 410. In the example of FIG. 4, the vehicle weight determination system 400 is communicatively coupled to the suspension system 102 of FIG. 1A, one or more of the motor(s) 124, 130, 202, the sensor(s) 106 of FIG. 1A and one or more example output devices (e.g., display devices, speakers, etc.) 412 via one or more communication links 414 such as, for example, one or more signal transmission wires or busses, radio frequency, etc. In particular, the example motor interface 402 provides control or command signals and/or power to the motor(s) 124, 130, 202 of the suspension system 102 to increase or decrease the ride height 108 of the vehicle 100. Similarly, in some examples, the weight determination system 400 provides control or command signals and/or power to the output device(s) 412 to generate information and/or inform a driver of vehicle weight.

To facilitate determining a weight (e.g., a total weight, a weight at a vehicle corner, etc.) of the vehicle 100, the weight determination system 400 directs the motor(s) 124, 130, 202 to control the suspension system 102. In particular, before, during, and/or after a vehicle loading event, the weight determination system 400 enables adjustments of the ride height 108, for example, to maintain a substantially uniform ride height 108 across the bottom portion 112 of the vehicle 100. More particularly, as the ride height 108 is adjusted, the weight determination system 400 measures and/or detects one or more parameters and/or characteristics associated with the suspension system 102 and/or the vehicle 100 such as, for example, one or more of the height 108, a motor output (e.g., a torque and/or a force generated by the motor(s) 124, 130, 202), and/or a motor input (e.g., electrical current provided to the motor(s) 124, 130, 202 by the motor interface 402, a voltage provided to the motor(s) 124, 130, 202 by the motor interface 402, and/or power provided to the motor(s) 124, 130, 202 by the motor interface 402).

In the example of FIG. 4, the example weight determiner 410 performs one or more calculations associated with determining a weight of the vehicle 100, for example, via one or more equations, models, algorithms and/or methods or techniques related to calculating a weight or load based on motor parameters. In some examples, the weight determiner 410 calculates and/or determines the weight based on one or more of current, voltage, and/or power of the motor(s) 124, 130, 202. For example, when adjusting the ride height 108 of the vehicle 100, each of the current, the voltage, and/or the power used by the motor 202 correlates with and/or is proportional to a torque or force that is sufficient to move the vehicle 100 between different ride heights. Similarly, in some examples, torque applied to the actuator 214 (e.g., imparted on a ball screw 220), as measured by the sensor(s) 106, correlates with and/or is proportional to weight imparted on the suspension system 102. As such, in some examples, the weight determiner 410 converts and/or translates motor input(s) and/or a motor output(s) to a value of the weight of the vehicle 100. For example, the database 406 may store a table of properties associated with a first type of vehicle. In such an example, the table may include properties such as current, voltage, and/or power of the motor(s) 124, 130, 202 that correlate with and/or are proportional to a torque or force that is sufficient to move the first type of vehicle between different ride heights. Further, such an example table may include a weight associated with the torque or force required to adjust the first type of vehicle to a particular ride height. For example, the table for the first type of vehicle may have a property that indicates 365 Nm of torque correlates to a change in ride height of 16 mm that corresponds to a total vehicle weight of 1515 kg. As such, the total vehicle weight can be determined based on a current or voltage applied to the motor(s) 124, 130, 202.

In some examples, the weight determiner 410 calculates and/or determines a weight of the vehicle 100 based on multiple weights (e.g., determined by the weight determiner 410). For example, the weight determiner 410 calculates and/or determines an average vehicle weight (e.g., an arithmetic mean) based on a weight corresponding to each corner of the vehicle 100. In some examples, the weight determiner 410 calculates and/or determines a vehicle weight that corresponds to a single corner of the vehicle 100.

In some examples, the data analyzer 408 calculates and/or determines one or more characteristics of the suspension system 102 based on sensor data to aid in vehicle weight calculations. In particular, the data analyzer 408 generates relationships between parameters of the suspensions system 102 that can be represented as plots, tables, maps, etc. as is disclosed in greater detail below in connection with FIG. 5. For example, the data analyzer 408 determines a relationship between changes in the ride height 108 and changes in motor output(s) and/or motor input(s).

In some such examples, the data analyzer 408 calculates and/or determines one or more parameters and/or characteristics of the data relationships such as a function shape, a slope, an inflection, a minimum, a maximum, a transition point, an integral, a derivative, etc. In some such examples, the data analyzer 408 calculates and/or determines one or more differences between the data relationship parameter(s) and/or characteristic(s) such as, for example, one or more offsets between slopes and/or shapes of respective data relationships.

In some examples, the data analyzer 408 generates and/or defines one or more relationships (e.g., empirical relationships) between measured suspension data and vehicle weight based on a type of the vehicle 100. For example, the data analyzer 408 generates a look-up table that correlates an offset to a weight of the vehicle 100. As such, in some examples, one or more of the equations, the models, the algorithms, and/or the methods or the techniques utilized by disclosed examples are specific to the vehicle 100. In other examples, one or more of the equations, the models, the algorithms, and/or the methods or the techniques to calculate and/or determine vehicle weight change to account for different vehicle types.

In some examples, after determining a weight of the vehicle 100, the weight determination system 400 generates visual and/or audible information (e.g., one or more alerts) via the output device(s) 412 based on the weight to inform a person (e.g., a driver, a passenger, vehicle service personnel, etc.) of a status of the vehicle 100. For example, the person views images via a display and/or listens to sounds via a speaker to identify when the vehicle 100 is properly loaded, improperly loaded (e.g., overloaded), and/or a degree to which the vehicle 100 is loaded. In such examples, to determine the status(es) of the vehicle 100, the data analyzer 408 compares the weight of the vehicle 100 to a threshold weight (e.g., stored in the database 406) that is based on a weight limit or capacity of the vehicle 100, which may be provided by a manufacturer of the vehicle 100.

To determine whether to generate an alert, the data analyzer 408 analyzes data received from one or more of the sensor interface 404, the database 406, and/or the data analyzer 408. In particular, the data analyzer 408 performs one or more comparisons of a vehicle weight to one or more thresholds (e.g., calculated and/or determined via the data analyzer 408), for example, to determine whether an example threshold is satisfied, whether a threshold is exceeded, a degree to which a threshold is exceeded, etc. As such, in some examples, the data analyzer 408 may transmit (e.g., via the wired and/or wireless communication link(s) 414) computed data to the output device(s) 412 and/or the database 406.

In some examples, the data analyzer 408 calculates a threshold weight based on a capacity or weight limit (e.g., a front axle weight limit, a rear axle weight limit, a gross vehicle weight limit, etc.) associated with the vehicle 100. In such examples, an example threshold weight corresponds to one or more proportions (e.g., 80%, 90%, 100%, etc.) of the weight limit. The weight capacity of the vehicle 100 may be stored in the database 406 and/or provided to the example weight determination system 400 by a user, for example, via an electronic or mobile device communicatively coupled to the weight determination system 400, an electronic device disposed in the vehicle 100, etc.

In the illustrated example of FIG. 4, the sensor interface 404 is communicatively coupled to the example sensor(s) 106 via the communication link(s) 414 to receive data therefrom. In some examples, the sensor(s) 106 generate data corresponding to the ride height 108 and provide the data to the sensor interface 404. In some examples, the sensor(s) 106 generate data corresponding to a torque, a force or load, an electrical current, a voltage, and/or a power and provide the data to the sensor interface 404.

The database 406 of the illustrated example stores and/or provides access to data associated with one or more of the vehicle 100 of FIG. 1A, the suspension system 102 of FIG. 1A, the shock absorber assembly 200 of FIG. 2, and/or the weight determination system 400. For example, the database 406 receives data from and/or transmits data to (e.g., via the wired and/or wireless communication link(s) 414) one or more of the motor interface 402, the sensor interface 404, the data analyzer 408, the load analyzer 310, and/or the weight determiner 410. Additionally, the database 406 stores sensor data generated by the sensor(s) 106.

In some examples, the database 406 stores one or more predetermined parameters and/or characteristics associated with the vehicle 100 and/or the suspension system 102. For example, the database 406 stores one or more data relationships that may be represented as one or more plots, tables, maps, etc. representing relationships (e.g., motor input(s) and/or output(s) relative to the height 108) that characterize behavior of the suspension system 102. In some such examples, the database 406 stores one or more trends (e.g., determined by the data analyzer 408) associated with actuation of the actuators 126, 134, 214 and/or changes in the ride height 108, as discussed further below in connection with FIG. 5.

In some examples, the database 406 stores one or more spring characteristics (e.g., a spring rate of the spring 208). In some examples, the database 406 stores one or more equations, models, algorithms and/or methods or techniques related to calculating a weight or load based on one or more parameters and/or characteristics of the suspension system 102.

While an example manner of implementing the example weight determination system 400 is illustrated in FIG. 4, one or more of the elements, processes and/or devices illustrated in FIG. 4 may be combined, divided, re-arranged, omitted, eliminated and/or implemented in any other way. Further, the example motor interface 402, the example sensor interface 404, the example database 406, the example data analyzer 408, the example weight determiner 410 and/or, more generally, the example weight determination system 400 of FIG. 4 may be implemented by hardware, software, firmware and/or any combination of hardware, software and/or firmware. Thus, for example, any of the example motor interface 402, the example sensor interface 404, the example database 406, the example data analyzer 408, the example weight determiner 410 and/or, more generally, the example weight determination system 400 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example motor interface 402, the example sensor interface 404, the example database 406, the example data analyzer 408, the example weight determiner 410 and/or, more generally, the example weight determination system 400 of FIG. 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example weight determination system 400 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
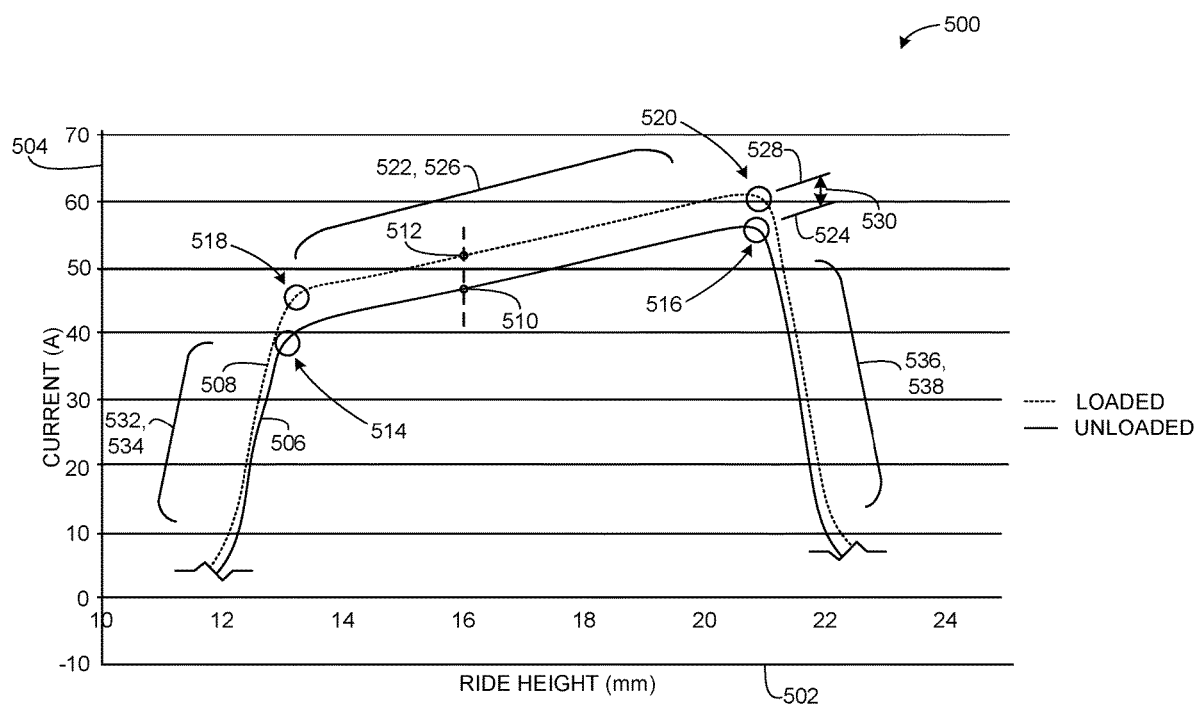
FIG. 5 is a graph illustrating example data associated with examples disclosed herein.

FIG. 5 is a graph 500 illustrating example data (e.g., stored in the database 406) associated with examples disclosed herein. The graph 500 includes a horizontal axis 502 that, in some examples, corresponds to one or more of position data, distance data, and/or relative displacement data associated with the vehicle 100 and/or the suspension system 102. As shown in FIG. 5, the horizontal axis 502 represents the ride height 108 (as represented in millimeters) measured by the sensor(s) 106. In some examples, the horizontal axis 502 represents the aforementioned position(s) and/or the displacement 300 of the first seat 204 measured by the sensor(s) 106. In the illustrated example of FIG. 5, the horizontal axis 502 starts at zero. However, the horizontal axis 502 may start at any value because the starting value of the horizontal axis 502 indicates that the vehicle is at rest (e.g., is not currently adjusting ride height).

According to the illustrated example, the graph 500 also includes a vertical axis 504 that corresponds to one or more of input data and/or output data associated with the suspension system 102. In some examples, the vertical axis 504 represents a motor parameter such as, for example, one or more of current, voltage, power, torque, or force. As shown in FIG. 5, the vertical axis 504 represents electrical current (as represented in amperes) provided to and/or consumed by one or more of the motors of the suspension system 102 (e.g., one or more of the motors 124, 130, 202).

According to the illustrated example, a first example plot 506 (as represented by the solid line in FIG. 5) and a second example plot 508 (as represented by the dotted/dashed line in FIG. 5) characterize adjustments and/or movement of the suspension system 102 that increase the ride height 108 of the vehicle 100. Therefore, movement along the first and second plots 506, 508 is from left to right (in the orientation of FIG. 5) in this example. However, in other examples, the first plot 506 and/or the second plot 508 characterize adjustments and/or movement of the suspension system 102 that decrease the ride height 108. In any case, the first plot 506 corresponds to sensor data received by the weight determination system 400 (e.g., via the sensor interface 404) when the vehicle 100 is substantially unloaded (e.g., the vehicle 100 is not carrying cargo, equipment, goods, etc.). The second plot 508 corresponds to sensor data received by the weight determination system 400 when the vehicle 100 is at least partially loaded. That is, the second plot 508 represents the vehicle 100 having a greater load than the first plot 506. As such, in some examples, the first plot 506 represents the vehicle 100 carrying at least some cargo, equipment, goods, etc. In some examples, the data associated with the first and second plots 506, 508 is stored in the database 406. The first and second plots 506, 508 of FIG. 5 are indicative of forces and/or torques generated by the suspension system 102 that cause the bottom portion 112 of the vehicle 100 to move relative to the driving surface 110. As such, the weight determination system analyzes at least some of the data forming the plots 506, 508 to calculate one or more weights of the vehicle 100, for example, via the data analyzer 408 and/or the weight determiner 410. While the example of FIG. 5 is described in terms of a plot, any type of data relationship such as a plot, map, table, etc. may be utilized to determine vehicle weight.

In some examples, the weight determination system 400 calculates and/or determines one or more differences between the plots 506, 508 to facilitate weight calculations. For example, the weight determination system 400 calculates and/or determines a first parameter 510 based on the first plot 506 and a second parameter 512 based on the second plot 508. In particular, in this example, the first parameter 510 and the second parameter 512 correspond to the same magnitude of ride height (e.g., about 16 millimeters in this example) and different motor currents (e.g., the first parameter 510 corresponds to about 47 amperes and the second parameter 512 corresponds to about 52 amperes).

Such motor parameters are related and/or proportional to a torque and/or a force sufficient to change the height 108 of the vehicle 100 by a certain distance. In some examples, based on the first parameter 510, the weight determiner 410 calculates and/or determines a first weight of the vehicle 100 corresponding to the vehicle 100 being unloaded. Similarly, based on the second parameter 512, the weight determiner 410 calculates and/or determines a second weight of the vehicle 100, different from the first weight, corresponding to the vehicle 100 being loaded. Accordingly, in such examples, the weight determiner 410 calculates and/or determines a third weight of the vehicle 100 based on the first and second parameters 510, 512 that, in some examples, corresponds to one or more of cargo, equipment, goods, etc. carried by the vehicle 100.

As shown in FIG. 5, the plots 506, 508 include example transition points 514, 516, 518, 520, for example, resulting from the motor 202 controlling the actuator 214, which can facilitate vehicle weight calculations. In particular, each transition point 514, 516, 518, 520 defines and/or indicates changes in characteristics of a respective plot 506, 508, for example, caused by frictional forces between components of the suspension system 102, spring properties, mass of unsprung weight, etc. In some examples, the weight determination system 400 calculates and/or determines (e.g., via the data analyzer 408) one or more of the transition points 514, 516, 518, 520 for the first plot 506 and/or the second plot 508.

As shown in FIG. 5, a first or intermediate portion 522 of the first plot 506 is defined between the first transition point 514 and the second transition point 516 and has a parameter and/or a characteristic associated therewith. In particular, the first portion 522 of the first plot 506 has a substantially constant slope 524 (e.g., calculated and/or determined by the data analyzer 408) along the length of the first portion 522, which is related to a spring rate of the spring 208 in some examples. Similarly, in the example of FIG. 5, a second or intermediate portion 526 of the second plot 508 is defined between the third transition point 518 and the fourth transition point 520 and has another parameter and/or characteristic associated therewith (e.g., a substantially constant slope 528 along the length of the second plot 508), which is also related to the spring rate of the spring 208 in some examples.

In some examples, the weight determination system 400 calculates and/or determines an offset 530 between portions of the respective plots 506, 508, which facilitates weight calculations. In some examples, the offset 530 is based on matching or similar slopes 524, 528. In some examples, the offset 530 is based on different motor parameters 510, 512 corresponding to the same ride height 108 of the vehicle 100. In such examples, the weight determination system 400 translates and/or converts a value of the offset 530 to a vehicle weight.

In some examples, the parameters and/or characteristics of the suspension data depicted in connection with FIG. 5 are specific to a type of vehicle. For example, the weight determination system 400 generates a look-up table defining a unique relationship between weight of the vehicle 100 and one or more of the parameters 510, 512, 514, 516, 518, 520, 522, 524, 526, 528 such as, for example, the offset 530. For example, the weight determination system 400 generates a look-up table defining a relationship between spring rate (corresponding to slopes 524, 528), current, change in ride height, and vehicle load for a specific vehicle type. In such an example, the weight determination system 400 determines a current required to move the vehicle 16 mm in an unloaded state (represented by plot 506). The weight determination system 400 knows the vehicle weight in an unloaded state based on a measured vehicle weight during manufacture, for example. In some examples, during manufacture, different loads may be applied to the vehicle, and subsequent current measurements may be taken while raising the vehicle a certain height. For example, the vehicle may be subjected to 10 lb. incremented loads up to 100 lbs. (e.g., first load at 10 lbs., second load at 20 lbs., etc.) while adjusting the ride height 16 mm. As such, the weight determination system 400 generates the look up table based on these different currents at different loads, for example.

That is, the weight determination system 400 can map a current to an estimated load carried by the vehicle. In some examples, the weight determination system 400 generates a look up table that maps the offset between currents when the vehicle is in an unloaded state and a loaded state. For example, the weight determination system 400 may map an offset (e.g., the offset 530) of a current required to move a loaded vehicle a certain distance to the current required to move the unloaded vehicle the same distance. As such, the weight determination system 400 may determine vehicle weight based on the offset 530, for example.

In the example of FIG. 5, to the left (in the orientation of FIG. 5) of the first transition point 514 of the first plot 506 and/or the third transition point 518 of the second plot 508, characteristic behavior of the suspension system 102 changes (e.g., resulting from frictional forces, motor properties, spring properties, etc.). As such, the first and third transition points 514, 518 define respective portions 532, 534 of the first and second plots 506, 508 that are different from the intermediate portions 522, 526. Similarly, in the example of FIG. 5, to the right (in the orientation of FIG. 5) of the second transition point 516 of the first plot 506 and/or the fourth transition point 520 of the second plot 508, characteristic behavior of the suspension system 102 changes. As such, the second and fourth transition points 516, 520 defines respective portions 536, 538 of the first and second plots 506, 508 that are different from the other portions 522, 526, 532, 534.

In some examples, the first and second plots 506, 508 are shaped differently from the plot shapes depicted in FIG. 5. In examples where the suspension system 102 is an air suspension system, one or more portions of the plots 506, 508 are substantially curved. In particular, in such examples, the weight determination system 400 calculates and/or determines a weight of the vehicle 100 based on one or more parameters (e.g., a degree of curvature) of the curved portions of the respective plots 506, 508 such as, for example, an offset between the curved portions.

In some examples, one or more of the portions 522, 526, 532, 534, 536, 538 of the plots 506, 508 and/or one or more of data points, shapes, inflections, minima, maxima, changes in slope, etc. thereof are advantageously used by disclosed examples to determine a weight of the vehicle 100. Further, some disclosed examples utilize any other appropriate graph characteristics, mathematical relationships, and/or plot shape characteristics in addition or alternatively to those depicted in connection with FIG. 5.

The example values and/or more generally, the example data depicted in connection with FIG. 5 is/are for illustrative purposes and, in other examples, other example values and/or data may apply.

Figure 6:
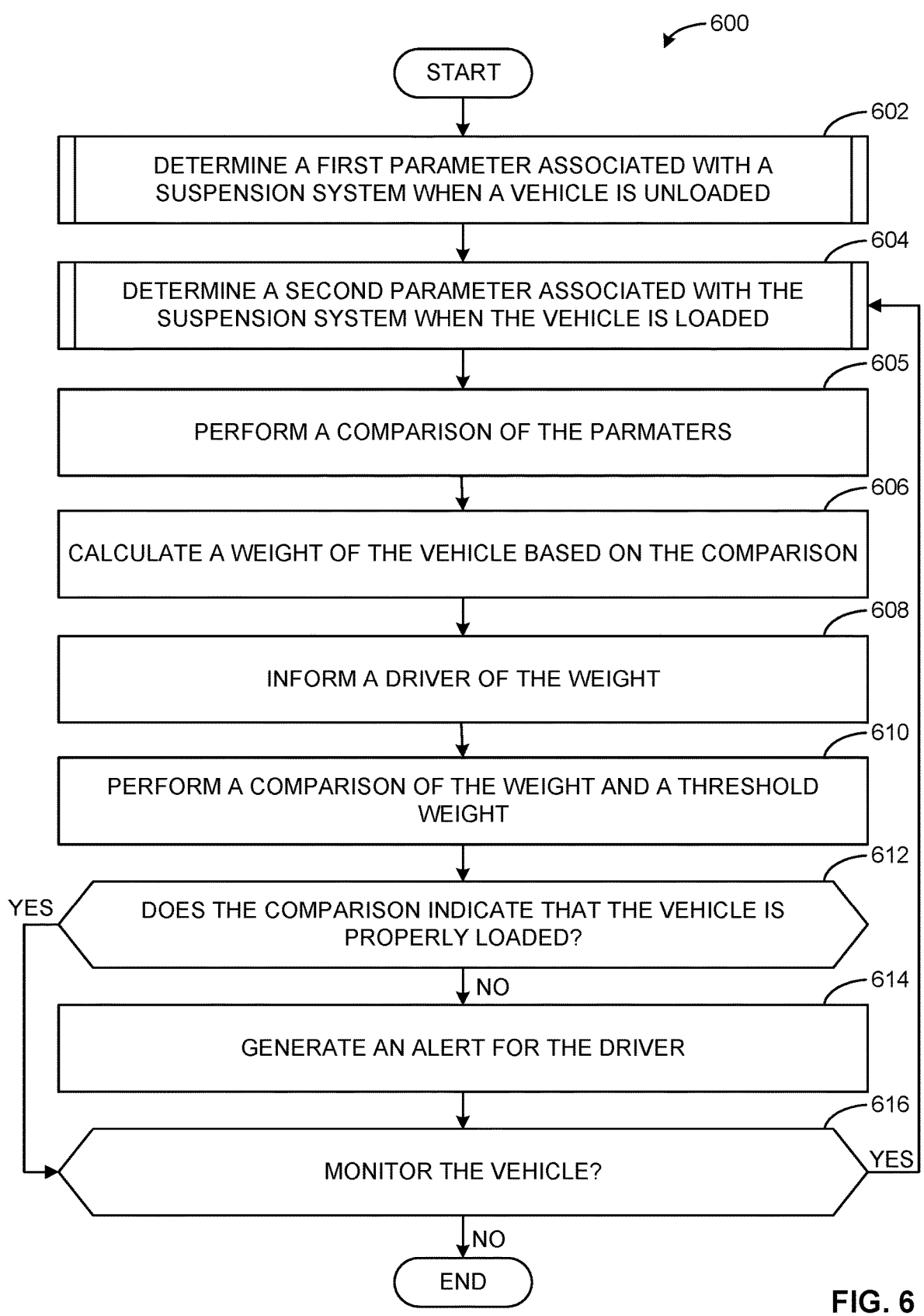
FIGS. 6-8 are flow diagrams of example methods that may be executed to implement the example weight determination system of FIG. 4.
Figure 7:
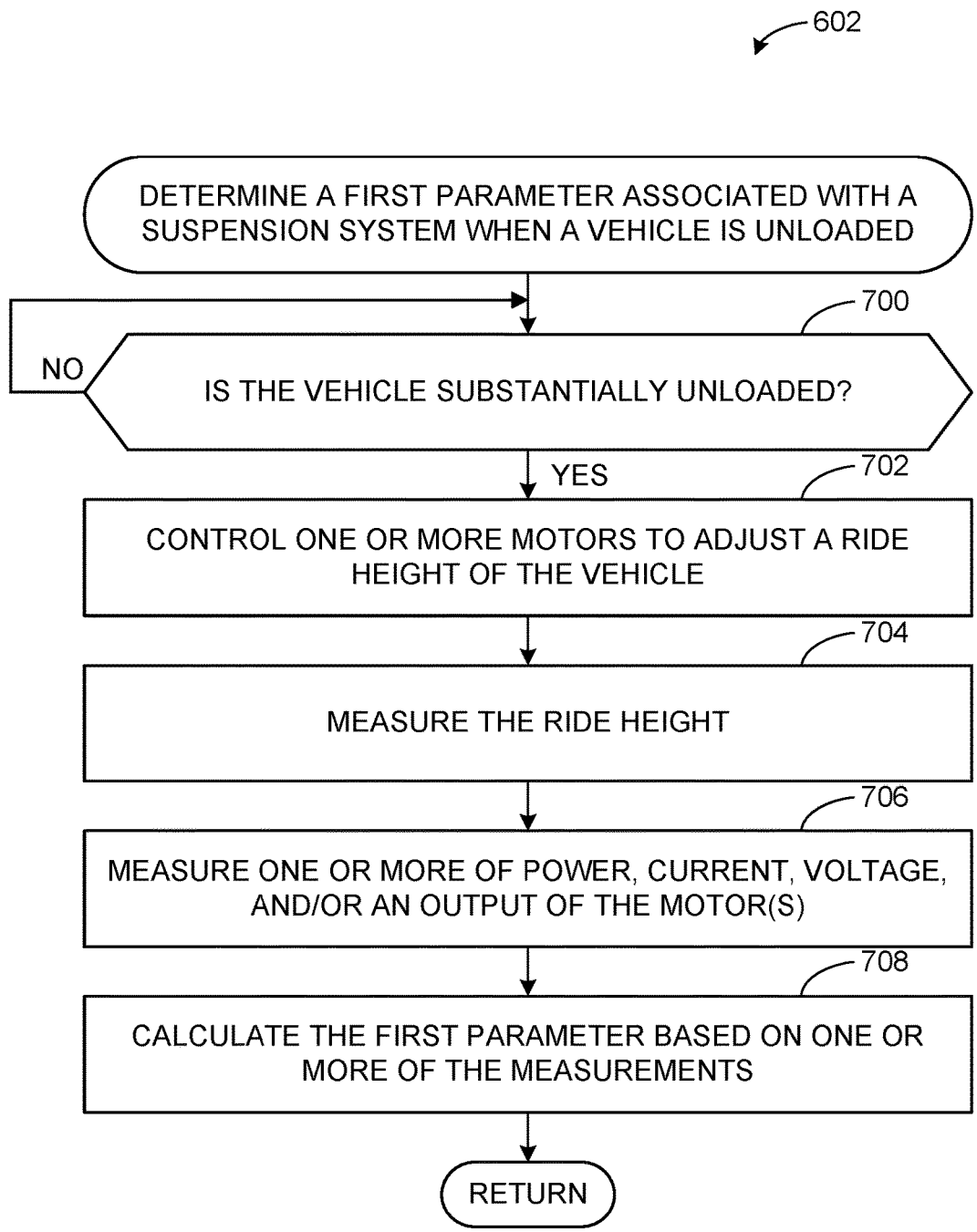
Figure 8:
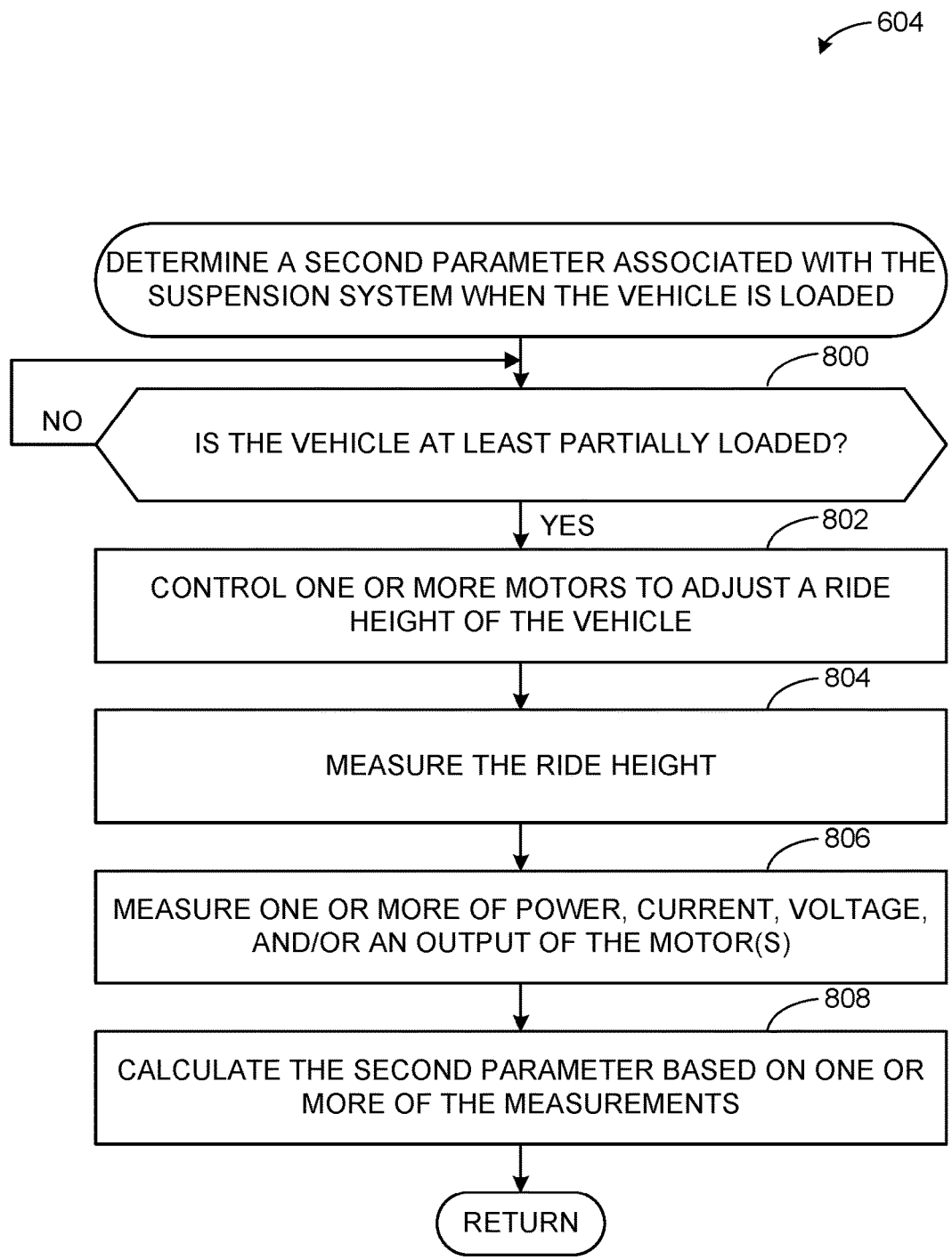

Flowcharts representative of example hardware logic or machine readable instructions for implementing the example weight determination system 400 are shown in FIGS. 6-8. The machine readable instructions may be a program or portion of a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 6-8, many other methods of implementing the example weight determination system 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 6 is a flowchart of an example method 600 that can be executed to implement the example weight determination system 400 of FIG. 4. The example method 600 of FIG. 6 can be implemented in any of the example vehicle 100 of FIG. 1A, the example suspension system 102 of FIG. 1A, the example controller 104 of FIG. 1A, the example shock absorber assembly 200 of FIGS. 2 and 3, and/or the example weight determination system 400 of FIG. 4.

The example method 600 begins by determining a first parameter associated with a suspension system when a vehicle is unloaded (block 602). In some examples, the weight determination system 400 of FIG. 4 determines (e.g., via the data analyzer 408 and/or the weight determiner 410) a first parameter associated with the suspension system 102 based on data received from the sensor(s) 106 such as, for example, one or more of the example parameters 510, 514, 516, 522, 524, 532, 536 associated with the first plot 506 depicted in connection with FIG. 5.

The example method 600 also includes determining a second parameter associated with the suspension system when the vehicle is loaded (block 604). In some examples, the weight determination system 400 of FIG. 4 determines a second parameter associated with the suspension system 102 based on data received from the sensor(s) 106 such as, for example, one or more of the example parameters 512, 518, 520, 526, 528, 534, 538 associated with the second plot 508 depicted in connection with FIG. 5.

The example method 600 also includes performing a comparison of the parameters (block 605). In some examples, the weight determination system 400 of FIG. 4 compares one or more of the parameters 510, 514, 516, 522, 524, 532, 536 associated with the first plot 506 to one or more of the parameters 512, 518, 520, 526, 528, 534, 538 associated with the second plot 508. In some examples, the weight determination system 400 determines one or more differences between the parameters 510, 512, 514, 516, 518, 520, 522, 524, 526, 528 and/or the plots 506, 508 such as, for example, the example offset 530.

The example method 600 also includes calculating a weight of the vehicle based on the comparison (block 606). In some examples, the weight determination system 400 of FIG. 4 calculates and/or determines a weight of the vehicle 100 based on the comparison at block 605, which can correspond to cargo, equipment, goods, etc. carried by the vehicle 100. For example, the weight determination system 400 may access a table for the vehicle 100 that identifies a torque value associated with a change in ride height that corresponds to a total weight of the vehicle 100.

The example method 600 also includes informing a driver of the weight (block 608). In some examples, the weight determination system 400 of FIG. 4 communicates with and/or controls the output devices 412 to inform a person (e.g., a driver, a passenger, etc.) of the weight of the vehicle 100. In some examples, the weight determination system 400 generates messages and/or displays information for viewing by the person.

The example method 600 also includes performing a comparison of the weight and a threshold weight (block 610). In some examples, the weight determination system 400 of FIG. 4 compares the weight of the vehicle 100 to one or more threshold weights, which facilitates indications of whether the vehicle is properly loaded and/or a degree to which the vehicle 100 is loaded.

The example method 600 also includes determining whether the comparison at block 610 indicates that the vehicle is properly loaded (block 612). In some examples, if the weight determination system 400 of FIG. 4 determines that the vehicle is properly loaded (e.g., the vehicle 100 is loaded below the weight capacity thereof) (block 612: YES), control of the example method 600 proceeds to block 616. Otherwise, in some examples, if the weight determination system 400 determines that the vehicle 100 improperly loaded (e.g., the vehicle 100 is loaded beyond the weight capacity thereof) (block 612: NO), control of the example method 600 proceeds to block 614.

The example method 600 also includes generating an alert for the driver (block 614). In some examples, the weight determination system 400 of FIG. 4 controls the output device(s) 412 to generate one or more of an audible and/or a visual alert. In some examples, the weight determination system 400 generates a sound via a speaker or transducer (e.g., a door chime). In some examples, the weight determination system 400 generates visual information and/or messages via a display (e.g., of a smartphone and/or electronic device disposed in the vehicle 100). In this manner, the weight determination system 400 prevents and/or deters the person from operating the vehicle 100 when improperly loaded, which improves vehicle handling and/or reduces risk of the vehicle 100 receiving fees and/or tickets for operating improperly.

The example method 600 also includes determining whether to monitor the vehicle (block 616). In some examples, if the weight determination system 400 of FIG. 4 determines that the vehicle 100 is being used (e.g., loaded, operated, etc.) (block 616: YES), the example method 600 returns to block 604. Otherwise, in some examples, if the weight determination system 400 determines that the vehicle 100 is not being used (block 616: NO), the process ends.

FIG. 7 is a flowchart of an example method 602 that can be executed to implement the weight determination system 400 of FIG. 4 to determine the first parameter associated with the suspension system when the vehicle is unloaded. In some examples, one or more operations of blocks 700, 702, 704, 706, and/or 708 are used to implement block 602 of FIG. 6.

The example method 602 begins by determining whether the vehicle is substantially unloaded (block 700). In some examples, if the weight determination system 400 of FIG. 4 determines that the vehicle 100 is loaded (block 700: NO), control of the example method 602 returns to block 700. Stated differently, in some examples, the weight determination system 400 waits for the vehicle 100 to be unloaded. As such, when the weight determination system 400 determines that the vehicle 100 is unloaded (block 700: YES), control of the example method 602 proceeds to block 702.

The example method 602 also includes controlling one or more motors to adjust a ride height of the vehicle (block 702). In some examples, the weight determination system 400 of FIG. 4 controls one or more of the motor(s) 124, 130, 202 of the suspension system 102, thereby changing the ride height 108. For example, the weight determination system 400 adjusts the ride height of the vehicle 100 in an unloaded state to determine a baseline torque or force measurement associated with adjusting the vehicle 100 ride height by a certain distance (e.g., 16 mm, 25 mm, 50 mm, etc.) that can be utilized to determine an offset between a subsequent torque or force measurement associated with adjusting the vehicle 100 ride height in a partially loaded state.

The example method 602 also includes measuring the ride height (block 704). In some examples, the weight determination system 400 of FIG. 4 measures the ride height 108 of the vehicle 100 via the sensor(s) 106 (e.g., see the example first plot 506 depicted in connection with FIG. 5).

The example method 602 also includes measuring one or more of power, current, voltage, and/or an output of the motor(s) (block 706). In some examples, the weight determination system 400 of FIG. 4 measures one or more of power, current, voltage, and/or output of the motor(s) 124, 130, 202 of the suspensions system 102 via the sensor(s) 106 (e.g., see the first plot 506).

The example method 602 also includes calculating the first parameter based on one or more of the measurements at blocks 704 and 706 (block 708). In some examples, the weight determination system 400 of FIG. 4 calculates and/or determines the first parameter associated with the suspension system 102 based on the ride height 108, the input of the motor(s) 124, 130, 202, and/or the output of the motor(s) 124, 130, 202 (e.g., see one or more of the example parameters 510, 514, 516, 522, 524, 532, 536 depicted in connection with FIG. 5).

In some examples, after calculating and/or determining the first parameter at block 708, control of the example method 602 returns to a calling function such as the example method 600.

FIG. 8 is a flowchart of an example method 604 that can be executed to implement the weight determination system 400 of FIG. 4 to determine the second parameter associated with the suspension system when the vehicle is loaded. In some examples, one or more operations of blocks 800, 802, 804, 806, and/or 808 are used to implement block 604 of FIG. 6.

The example method 604 begins by determining whether the vehicle is at least partially loaded (block 800). In some examples, if the weight determination system 400 of FIG. 4 determines that the vehicle 100 is unloaded (block 800: NO), control of the example method 602 returns to block 800. Stated differently, in some examples, the weight determination system 400 waits for the vehicle 100 to be loaded. As such, when the weight determination system 400 determines that the vehicle 100 is loaded (block 800: YES), control of the example method 602 proceeds to block 802.

The example method 604 also includes controlling one or more motors to adjust a ride height of the vehicle (block 802). In some examples, the weight determination system 400 of FIG. 4 controls the one or more motor(s) 124, 130, 202 of the suspension system 102, thereby changing the ride height 108. For example, the weight determination system 400 adjusts the ride height a certain distance (e.g., 16 mm, 25 mm, 50 mm, etc.) similar to the distance utilized when adjusting the ride height in the unloaded state of FIG. 7.

The example method 604 also includes measuring the ride height (block 804). In some examples, the weight determination system 400 of FIG. 4 measures the ride height 108 of the vehicle 100 via the sensor(s) 106 (e.g., see the example second plot 508 depicted in connection with FIG. 5).

The example method 604 also includes measuring one or more of power, current, voltage, and/or an output of the motor(s) (block 806). In some examples, the weight determination system 400 of FIG. 4 measures one or more of power, current, voltage, and/or output of the motor(s) 124, 130, 202 of the suspensions system 102 via the sensor(s) 106 (e.g., see the second plot 508).

The example method 604 also includes calculating the second parameter based on one or more of the measurements at blocks 804 and 806 (block 808). In some examples, the weight determination system 400 of FIG. 4 calculates and/or determines the second parameter associated with the suspension system 102 based on the ride height 108, the input of the motor(s) 124, 130, 202, and/or the output of the motor(s) 124, 130, 202 (e.g., see one or more of the example parameters 512, 518, 520, 526, 528, 534, 538 depicted in connection with FIG. 5).

In some examples, after calculating and/or determining the second parameter at block 808, control of the example method 604 returns to a calling function such as the example method 600.

Figure 9:
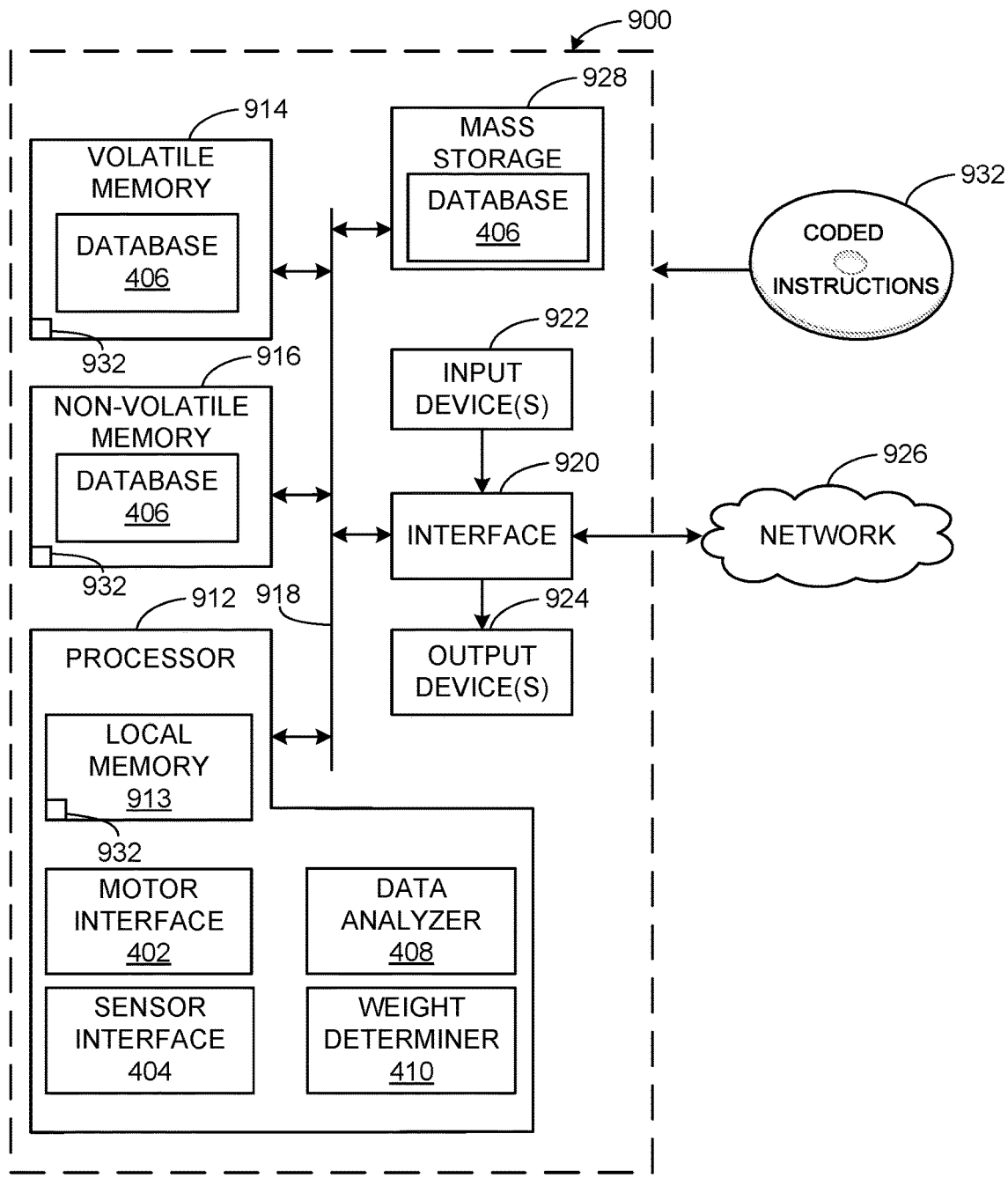
FIG. 9 is a block diagram of an example processor platform structured to execute instructions to carry out the example methods of FIGS. 6-8 and/or, more generally, to implement the example weight determination system of FIG. 4.

FIG. 9 is a block diagram of an example processor platform 900 structured to execute instructions to carry out the example methods 600, 602, 604 of FIGS. 6-8 and/or, more generally, to implement the example weight determination system 400 of FIG. 4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example motor interface 402, the example sensor interface 404, the example data analyzer 408, and the example weight determiner 410.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 6-8 may be stored in the mass storage device 928, in the volatile memory 914, in the non-volatile memory 916, and/or on a removable non-transitory computer readable storage medium such as a CD or DVD.

From the foregoing, it will be appreciated that methods and apparatus to determine vehicle weight have been disclosed that assist a person in loading and/or operating a vehicle by facilitating vehicle weight determinations. Some disclosed examples provide visual and/or audible alerts to the person when the vehicle is improperly loaded.

The following paragraphs provide various examples of the examples disclosed herein.

Example 1 can be a vehicle controller configured to control a motor operatively coupled to a suspension system to raise or lower a vehicle, determine a first parameter of the motor while controlling the motor to raise or lower the vehicle when the vehicle is unloaded, determine a second parameter of the motor while controlling the motor to raise or lower the vehicle when the vehicle is at least partially loaded, and calculate a weight of the vehicle based on the first and second parameters of the motor.

Example 2 includes the apparatus of example 1, wherein the vehicle controller operates the motor to change a ride height of the vehicle.

Example 3 includes the apparatus of any one of examples 1-2, wherein the vehicle controller operates the motor to adjust a spring seat.

Example 4 includes the apparatus of any one of examples 1-3, further including a sensor to measure the first parameter when the vehicle is unloaded.

Example 5 includes the apparatus of any one of examples 1-4, further including the sensor to measure the second parameter when the vehicle is at least partially loaded.

Example 6 includes the apparatus of any one of examples 1-5, wherein the first and second parameters include i) a ride height of the vehicle, ii) a current, a voltage, or a power provided to the motor, or iii) a torque, or a force provided from the motor.

Example 7 includes the apparatus of any one of examples 1-6, wherein the vehicle controller is to generate i) a first data relationship for the first parameter when the vehicle is unloaded, and ii) a second data relationship for the second parameter when the vehicle is at least partially loaded.

Example 8 includes the apparatus of any one of examples 1-7, wherein the vehicle controller is to generate the first and second data relationships by generating a first plot corresponding to the first data relationship, and a second plot corresponding to the second data relationship.

Example 9 includes the apparatus of any one of examples 1-8, wherein the vehicle controller is to determine the weight of the vehicle based on an offset between the first parameter of the motor from the first plot and the second parameter of the motor from the second plot.

Example 10 can be a suspension system, and a controller configured to: control, via a motor, the suspension system to adjust a ride height of the vehicle, perform a comparison of first and second parameters of the motor, the first parameter based on operating the motor when the vehicle is unloaded, the second parameter based on operating the motor when the vehicle is at least partially loaded, and calculate a weight of the vehicle based on the comparison.

Example 11 includes the vehicle of example 10, further including sensors to determine the first and second parameters based on measuring one or more of electrical current, voltage, or, power used by the suspension system in response to adjusting the ride height.

Example 12 includes the vehicle of any one of examples 10-11, wherein the controller controls, via the motor, the suspension system by adjusting a position of an actuator to adjust the ride height of the vehicle.

Example 13 includes the vehicle of any one of examples 10-12, wherein the controller generates one or more data relationships between the first and second parameters of the suspension system, the first parameter in a first data relationship and the second parameter in a second data relationship.

Example 14 includes the vehicle of any one of examples 10-13, wherein the controller calculates the weight of the vehicle based on an offset of the comparison between the first and second parameters, the offset based on a difference between motor parameters corresponding to a same ride height of the vehicle.

Example 15 includes the vehicle of any one of examples 10-14, wherein the controller operates the motor when the vehicle is unloaded to determine at least one of a baseline current, torque, or force measurement associated with adjusting the ride height of the vehicle to a first ride height.

Example 16 can be a tangible machine-readable storage medium including instructions which, when executed, cause a processor to at least control a motor operatively coupled to a suspension system to change a ride height of a vehicle, determine a first parameter of the motor while controlling the motor to raise or lower the vehicle when the vehicle is unloaded, determine a second parameter of the motor while controlling the motor to raise or lower the vehicle when the vehicle is loaded, and calculate a weight of the vehicle based on the first and second parameters of the motor.

Example 17 includes the tangible machine-readable storage medium of example 16, wherein the instructions, when executed, further cause the processor to measure the first parameter when the vehicle is unloaded, and measure the second parameter when the vehicle is at least partially loaded.

Example 18 includes the tangible machine-readable storage medium of any one of examples 16-17, wherein the first and second parameters include i) a ride height of the vehicle, ii) a current, a voltage, or a power provided to the motor, or iii) a torque, or a force provided from the motor.

Example 19 includes the tangible machine-readable storage medium of any one of examples 16-18, wherein the instructions, when executed, further cause the processor to generate i) a first data relationship for the first parameter when the vehicle is unloaded, and ii) a second data relationship for the second parameter when the vehicle is at least partially loaded.

Example 20 includes the tangible machine-readable storage medium of any one of examples 16-19, wherein the instructions, when executed, further cause the processor to generate the first and second data relationships by generating a first plot corresponding to the first data relationship, and a second plot corresponding to the second data relationship.

Example 21 includes the tangible machine-readable storage medium of any one of examples 16-20, wherein the instructions, when executed, further cause the processor to determine the weight of the vehicle based on an offset between the first parameter of the motor from the first plot and the second parameter of the motor from the second plot.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a suspension airbag;
   a pump fluidly coupled to the suspension airbag, the pump to control a fluid pressure in the suspension airbag to cause ride height adjustments for a vehicle;

a motor operatively coupled to the pump, the motor to receive a first motor input that causes the vehicle to rise or lower when the vehicle is unloaded and a second motor input that causes the vehicle to rise or lower when the vehicle is carrying a load;

machine-readable instructions; and at least one processor circuit to be programmed by the machine-readable instructions to calculate a weight of the vehicle based on an offset between (a) the first motor input at a first ride height for the vehicle and (b) the second motor input at the first ride height for the vehicle.

2. The apparatus of claim 1, wherein one or more of the at least one processor circuit is to cause the first motor input to be provided to the motor in response to when the vehicle is unloaded and the second motor input to be provided to the motor in response to the vehicle carrying the load.

3. The apparatus of claim 1, further including a sensor to measure (a) the first motor input when the vehicle is unloaded and (b) the second motor input when the vehicle is carrying the load.

4. The apparatus of claim 1, wherein the first motor input is a first current provided to the motor, and the second motor input is a second current, the first current different than the second current.

5. The apparatus of claim 1, wherein the pump is fluidly coupled to the suspension airbag via a fluid line, and further including a fluid valve fluidly coupled to the fluid line between the suspension airbag and the pump.

6. The apparatus of claim 5, wherein one or more of the at least one processor circuit is to control a position of the fluid valve to control the fluid pressure in the suspension airbag.

7. The apparatus of claim 1, wherein the pump is fluidly coupled to the suspension airbag via a fluid line, and further including a fluid reservoir fluidly coupled to the fluid line between the suspension airbag and the pump.

8. A vehicle comprising:
a suspension system;
a suspension airbag;
a pump fluidly coupled to the suspension airbag;
a motor operatively coupled to the pump, the motor to receive a first motor input and a second motor input;
machine-readable instructions; and
at least one processor circuit to be programmed by the machine-readable instructions to:
cause the first motor input to be provided to the motor to cause the motor to adjust a ride height of the vehicle in a first direction when the vehicle is unloaded;
cause the second motor input to be provided the motor to cause the motor to adjust the ride height of the vehicle in the first direction when the vehicle is loaded; and
calculate a weight of the vehicle based on the first motor input, the second motor input, and the respective ride heights of the vehicle when the vehicle is unloaded and when the vehicle is loaded.

9. The vehicle of claim 8, wherein the first motor input is to cause the motor to adjust the ride height between a first ride height and a second ride height when the vehicle is unloaded, the second motor input is to cause the motor to adjust the ride height between the first ride height and the second ride height when the vehicle is loaded, and wherein one or more of the at least one processor circuit is to calculate the weight based on a difference between (a) the first motor input when the vehicle is at a third ride height between the first ride height and the second ride height and (b) the second motor input when the vehicle is at the third ride height between the first ride height and the second ride height.

10. The vehicle of claim 8, wherein the first motor input includes a first electrical current and the second motor input includes a second electrical current, and further including a sensor to measure the first electrical current when the vehicle is unloaded and the second electrical current when the vehicle is carrying the load.

11. The vehicle of claim 8, wherein one or more of the at least one processor circuit is to generate an alert in response to the calculated weight of the vehicle exceeding a weight capacity associated with the vehicle.

12. The vehicle of claim 8, wherein the pump is fluidly coupled to the suspension airbag via a fluid line, and further including at least one of a fluid valve or a fluid reservoir fluidly coupled to the fluid line between the suspension airbag and the pump.

13. The vehicle of claim 8, wherein the first motor input and the second motor input cause the suspension airbag to expand or contract to change the ride height of the vehicle.

14. The vehicle of claim 8, wherein the suspension airbag is a first suspension airbag proximate a first wheel, the pump is a first pump, and further including:
a second suspension airbag proximate a second wheel; and
a second pump fluidly coupled to the second suspension airbag.

15. An apparatus comprising:
a sensor to:
measure a first motor input provided to a motor in response to the motor raising or lowering a ride height of a vehicle from a first ride height to a second ride height when the vehicle is unloaded; and
measure a second motor input provided to the motor in response to the motor raising or lowering the ride height of the vehicle from the first ride height to the second ride height when the vehicle is loaded;
machine-readable instructions; and
at least one processor circuit be programmed by the machine-readable instructions to calculate a weight carried by the vehicle when the vehicle is loaded based on (i) a value of the first motor input when the ride height of the vehicle is at a third ride height between the first ride height and the second ride height and (ii) a value of the second motor input when the ride height of the vehicle at the third ride height.

16. The apparatus of claim 15, wherein one or more of the at least one processor circuit is to:
determine an offset between the first motor input and the second motor input; and
determine the weight carried by the vehicle based on the offset.

17. The apparatus of claim 15, wherein the first motor input and the second motor input correspond to a same ride height adjustment of the vehicle.

18. The apparatus of claim 15, wherein the first motor input is a first current and the second motor input is a second current, one or more of the at least one processor circuit to control the first current and the second current provided to the motor, respectively.

19. The apparatus of claim 15, wherein one or more of the at least one processor circuit is to cause the motor to control a fluid pressure in a suspension airbag, the suspension airbag to cause a change from the first ride height to the second ride height of the vehicle.

20. The apparatus of claim 15, wherein the first motor input is a first current, the second motor input is a second current, and one or more of the at least one processor circuit is to determine the weight carried by the vehicle based on a value of the first current associated with the third ride height and a value of the second current associated with the third ride height.

\* \* \* \* \*

UNITED STATES PATENT AND TRADEMARK OFFICE
CERTIFICATE OF CORRECTION

PATENT NO. : 12,370,853 B2  
APPLICATION NO. : 18/152632  
DATED : July 29, 2025  
INVENTOR(S) : Niedert et al.

Page 1 of 1

It is certified that error appears in the above-identified patent and that said Letters Patent is hereby corrected as shown below:

In the Claims

In Column 21, Claim 2, Line 15, delete "in response to".

Signed and Sealed this  
Fourteenth Day of October, 2025

John A. Squires  
*Director of the United States Patent and Trademark Office*